May 30, 1950      W. E. OLSON      2,509,937
BICYCLE BALANCING AND STAND ATTACHMENT
Filed March 1, 1948      2 Sheets-Sheet 1
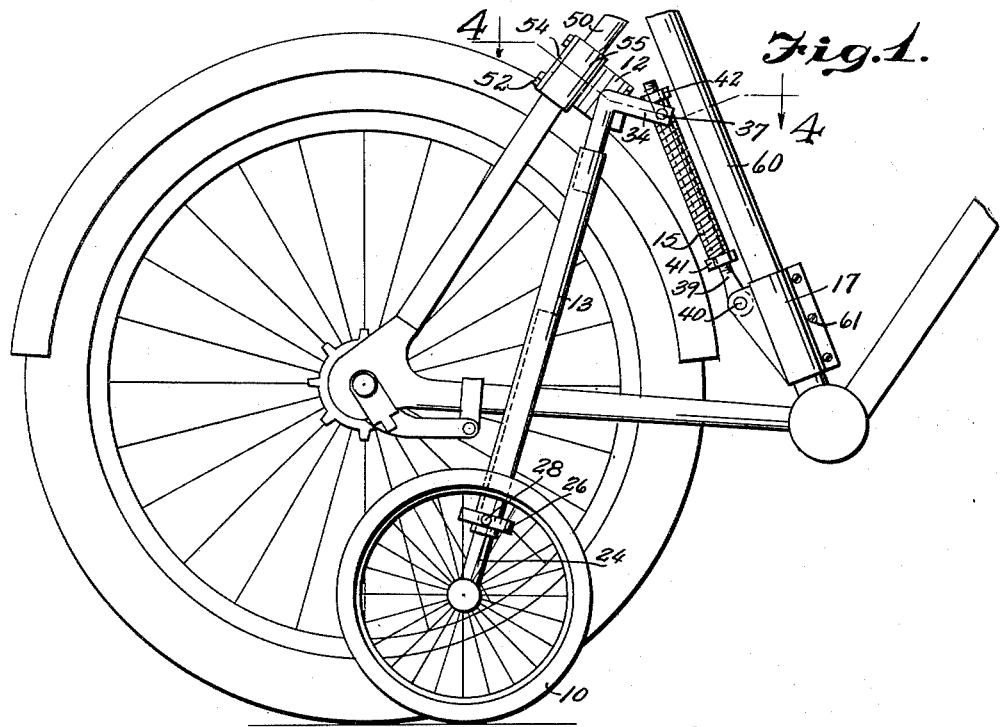
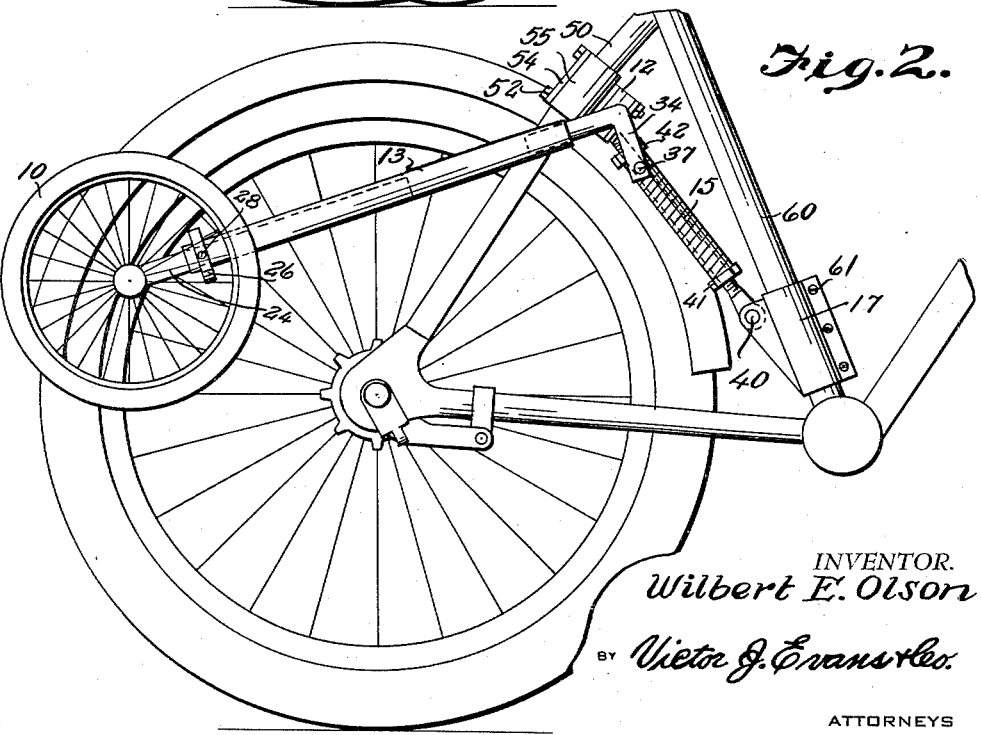
INVENTOR.
Wilbert E. Olson
BY Victor J. Evans & Co.
ATTORNEYS

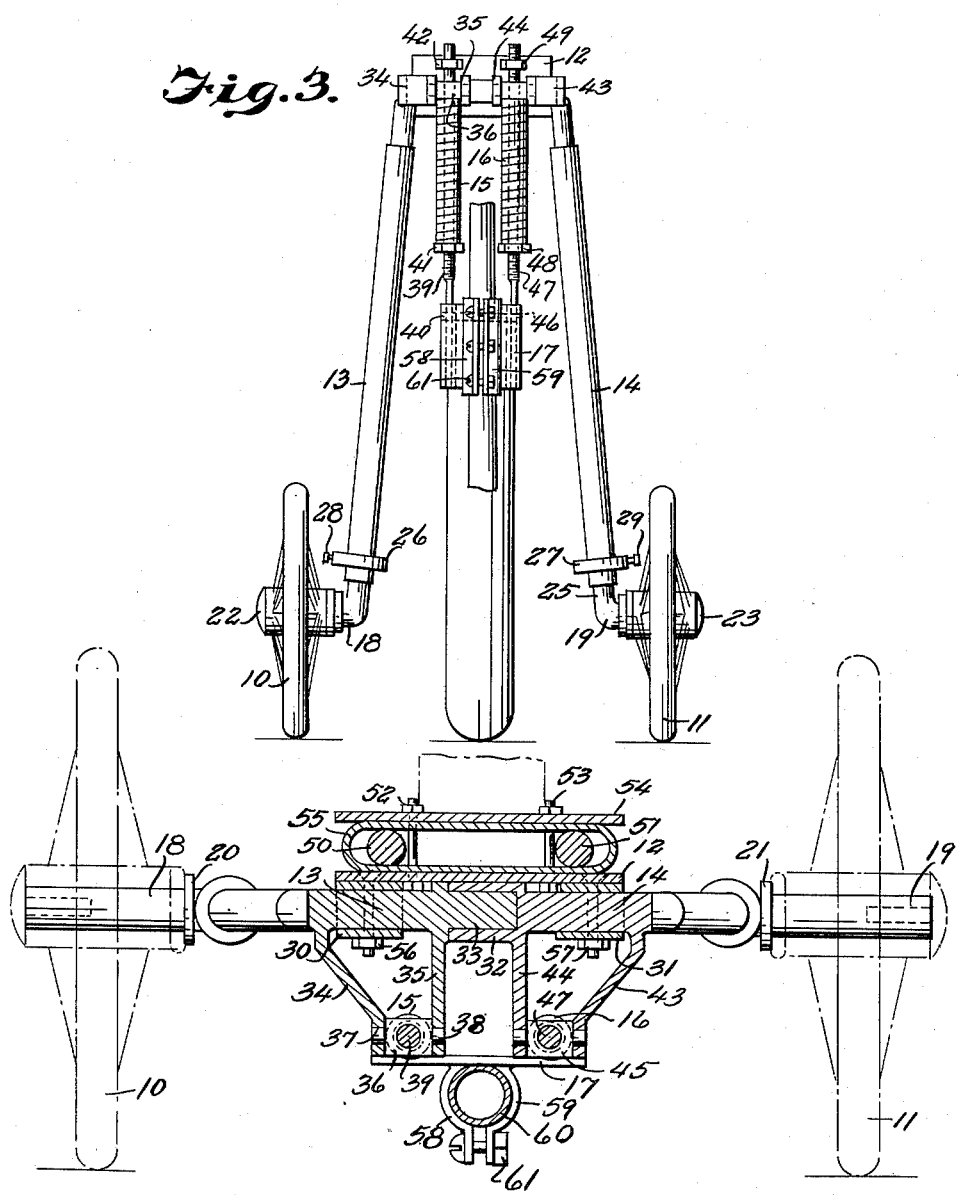

Patented May 30, 1950

2,509,937

UNITED STATES PATENT OFFICE 2,509,937

BICYCLE BALANCING AND STAND ATTACHMENT

Wilbert E. Olson, St. Paul, Minn.

Application March 1, 1948, Serial No. 12,223

5 Claims. (Cl. 280—303)

This invention relates to balancing and standing attachments for two wheel bicycles which facilitate riding by young children and beginners, and in particular two auxiliary wheels with mounting attachments whereby the wheels are pivotally mounted on the frame of a bicycle at a point below the saddle and resiliently held by springs mounted on the frame in either operative or inoperative positions.

The purpose of this invention is to provide balancing and standing means for bicycles of the two wheel type so that children and beginners may ride with ease and also so that delivery and news boys may readily load and unload baskets of bicycles.

The usual tricycle or three wheel bicycle is not provided with a coaster brake or other slowing or stopping means so that these devices are not safe on sidewalks or streets in the average city, and although the average bicycle is provided with a stand the stand is not sufficient to support the bicycle with a basket thereon loaded with newspapers or the like. With these thoughts in mind this invention contemplates an attachment that is readily mounted on a two wheel bicycle which provides two auxiliary wheels positioned at the sides of the bicycle with the wheels held by springs to permit tilting to a predetermined degree, but which prevent the bicycle turning over under ordinary circumstances.

The object of this invention is, therefore, to provide means for mounting two auxiliary wheels at the sides of a two wheel bicycle wherein the wheels are resiliently held in operative and inoperative positions and in which the wheels are adapted to yield slightly in use.

Another object of the invention is to provide means for mounting balancing wheels on a bicycle so that the wheels may readily be snapped upwardly to inoperative positions wherein the bicycle may be used in the usual manner.

Another object of the invention is to provide means for mounting balancing wheels at the sides of a bicycle with the wheels resiliently held in which means is provided for adjusting the tension on the wheels.

Another object of the invention is to provide an attachment for bicycles which provides auxiliary wheels at the sides that is readily adjustable to bicycles of different sizes.

A further object of the invention is to provide an attachment for mounting auxiliary wheels at the sides of bicycles to facilitate balancing and standing of the bicycle which is of a simple and economical construction.

With these and other objects and advantages in view the invention consists of the new and novel combination, construction, and arrangement of parts as hereinafter more fully described, set forth in the claims appended hereto, and disclosed in the accompanying drawings forming part hereof, wherein:

Figure 1 is a view showing a side elevation of the rear portion of a bicycle with parts broken away illustrating the attachment in the operative position.

Figure 2 is a similar view illustrating the attachment in the inoperative position.

Figure 3 is a view showing a front elevation of the attachment with parts of the bicycle omitted and with the rear wheel and part of the bicycle frame shown in combination therewith.

Figure 4 is a sectional plan through the upper part of the attachment and bicycle frame taken on line 4—4 of Figure 1 with the wheels indicated in dotted lines.

Referring now to the drawings wherein like reference characters denote corresponding parts the bicycle balancing and standing attachment of this invention includes a pair of auxiliary wheels 10 and 11 pivotally mounted on a bicycle frame through a block 12 with the wheels carried by telescoping arms 13 and 14 and resiliently held by springs 15 and 16 which are mounted on the frame through a clamp 17.

The wheels 10 and 11 are rotatably mounted on horizontally disposed shafts 18 and 19, respectively, and the shafts are provided with collars 20 and 21 against which the hubs of the wheels are held by screws 22 and 23. The inner ends 24 and 25 of the shafts extend upwardly into the arms 13 and 14 and collars 26 and 27 are provided around the lower ends of the arms in which set screws 28 and 29 are threaded which provide means for adjustably holding the inner ends 24 and 25 of the shafts.

The upper ends of the arms 13 and 14 are pivotally held in bearings 30 and 31, respectively, which extend outward from the block 12, as shown in Figure 4, and the arm 14 is provided with a bell-like socket 32 into which the end 33 of the arm 13 is positioned which provides a swivel joint wherein either wheel may yield to permit turning corners. The upwardly and inwardly extended end of the arm 13 is, therefore, pivotally mounted in the corresponding end of the arm 14 whereby the arm of the wheel 10 is free to swivel or turn in relation to the arm 14 of the wheel 11 so that as a bicycle is banked or tilted to turn a corner one wheel may move upwardly and the other downwardly. The upper end of the arm 13 is provided with extensions 34 and 35 in the ends of which a saddle 36 is pivotally mounted by pins 37 and 38, and the saddle is resiliently held upward by the spring 15 which is positioned around a threaded rod 39, the lower end of which is pivotally mounted in the clamp 17 by a pin 40. The rod 39 is provided with a lower nut 41 which holds the lower end of the spring and the upper end and saddle are held by a nut 42. With the parts arranged as illustrated in Figures 1 and 2 the spring 15 exerts an upward pressure against the saddle to hold the wheel 10 in the operative position, as shown in Figure 1, and as the wheel is moved upward to the inoperative position shown in Figure 2 the saddle passes over the center of the pivot wherein the spring also holds the wheel upward in the inoperative position. The tension on the spring and the position of the wheel 10 may be adjusted by the nuts 41 and 42.

The upper end of the arm 14 is also provided with extensions similar to the extensions 34 and 35, as indicated by the numerals 43 and 44, and a saddle 45 is pivotally held in the ends thereof so that it rests on the upper end of the spring 16, the lower end of which is pivotally held in the clamp 17 on a pin 46, the spring being positioned on a threaded rod 47 and adjustably held by the nuts 48 and 49.

The block 12 is clamped on the bars 50 and 51 of the rear wheel yoke by bolts 52 and 53 with the bolts extending through the block and also through a plate 54 with a protecting member 55 between the block and plate and the bars of the yoke, as shown in Figure 4. The bearings 30 and 31 are bolted to the block 12 with bolts 56 and 57. The clamp 17 is provided with arms 58 and 59 by which it is secured on the upright 60 of the frame of the bicycle by screws with nuts 61.

With the parts arranged in this manner the auxiliary wheels 10 and 11 are resiliently and adjustably mounted on a bicycle so that with the bicycle upright the wheels will touch the ground and should the bicycle be released the auxiliary wheels will hold the bicycle upright. The bicycle may be used in the usual manner, and when training a beginner it will remain upright until the beginner feels the balance or proper upright position. The auxiliary wheels may then be moved upward to the inoperative position as shown in Figure 2, and the bicycle may be used without the aid of the wheels 10 and 11. The auxiliary wheels are particularly helpful for boys delivering packages, and also for newsboys with heavy bundles of papers in a basket, as when released, the bicycle will remain upright, and the boy may readily place newspapers or packages in a basket on the bicycle without danger of the bicycle turning over.

It will be understood that modifications may be made in the design or arrangement of the parts without departing from the spirit of the invention.

What is claimed is:

1. An attachment for bicycles of the two wheel type comprising a pair of auxiliary wheels, arms with L-shaped upper ends on the lower ends of which the auxiliary wheels are carried pivotally mounted on the bicycle with the auxiliary wheels extended at opposite sides of the rear wheel of the bicycle, means connected to the extended arms of the L-shaped upper ends of the arms for resiliently urging the said auxiliary wheels downward in the operative positions, said means also adapted to hold the auxiliary wheels upward in inoperative positions, and means adjusting the tension of the said resilient means.

2. An attachment for bicycles of the two wheel type comprising a pair of auxiliary wheels, arms with L-shaped upper ends on the lower ends of which the auxiliary wheels are carried pivotally mounted on the bicycle with the said auxiliary wheels extended at opposite sides of the rear wheel of the bicycle, means connected to the extended arms of the L-shaped upper ends of the arms for resiliently urging the auxiliary wheels downward into operative positions, said resilient means also adapted to hold the auxiliary wheels upward in inoperative positions, means adjusting the tension of the said resilient means, and means adjusting the positions of the auxiliary wheels in the said mounting arms.

3. An attachment for bicycles of the two wheel type comprising a pair of auxiliary wheels, arms with L-shaped upper ends on the lower ends of which the auxiliary wheels are carried pivotally mounted on the bicycle with the wheels extended at opposite sides of the rear wheel of the bicycle, said wheels being thereby independently mounted wherein each wheel is adapted to move upwardly or downwardly in relation to the other, means connected to the extended arms of the L-shaped upper ends of the arms for resiliently urging the auxiliary wheels downward into operative positions independently, said resilient means also adapted to hold the wheels upward in inoperative positions, means adjusting the tension of the said resilient means, and means independently adjusting the positions of the said auxiliary wheels in the said mounting arms.

4. In a balancing and standing attachment for bicycles having frames with front and rear wheels, the combination, which comprises, a pair of auxiliary wheels, a bearing block adapted to be clamped on the frame of the bicycle above the rear wheel, downwardly disposed arms pivotally mounted in said bearing block, means rotatably mounting the said auxiliary wheels on the lower ends of the arms with the auxiliary wheels extended at opposite sides of the rear wheel of the bicycle, said arms having forwardly disposed extensions at the upper ends thereof, a clamp mounted on the frame of the bicycle positioned in front of the rear wheel and at a point on the lower part of said frame, vertically disposed springs carried by and pivotally mounted in the said clamp, and means pivotally attaching the upper ends of the springs to the said extensions of the arms, whereby the springs urge the wheels downwardly to operative positions and also upwardly to inoperative positions when the wheels are moved upwardly to such position that the pivotal connection to the spring passes over the center of the pivotal mountings of the arms.

5. In a balancing and standing attachment for bicycles having frames with front and rear wheels, the combination, which comprises, a pair of auxiliary wheels, a bearing block adapted to be clamped on the frame of the bicycle above the rear wheel, downwardly disposed arms pivotally mounted independently in said bearing block, means rotatably mounting the said auxiliary wheels on the lower ends of the arms with the auxiliary wheels extended at opposite sides of the rear wheel of the bicycle, means adjusting the positions of the auxiliary wheels in the arms, said arms having forwardly disposed extensions at the upper ends thereof, saddles pivotally mounted in the ends of said extensions, a clamp adapted to be mounted on the frame of the bicycle, vertically disposed threaded rods pivotally mounted in the clamp, said rods extending through the said saddles, springs on the said rods, and adjusting nuts on the rods positioned above the saddles and below the springs.

WILBERT E. OLSON.

REFERENCES CITED

The following references are of record in the file of this patent:

UNITED STATES PATENTS

| Number | Name | Date |
|---|---|---|
| 106,529 | Wyndham | Aug. 16, 1870 |
| 602,670 | Trapp | Apr. 19, 1898 |
| 649,909 | Von Bultzingslowen | May 22, 1900 |